United States Patent [19]
Mizoguchi et al.

[11] Patent Number: 5,841,466
[45] Date of Patent: Nov. 24, 1998

[54] OPTICAL VISUALIZING APPARATUS AND METHOD OF CONTROLLING THE SAME

[75] Inventors: Motoshi Mizoguchi; Daiji Takahashi; Yoshio Okoshi, all of Kanagawa, Japan

[73] Assignee: Sony Corporation, Japan

[21] Appl. No.: 717,277

[22] Filed: Sep. 20, 1996

[30] Foreign Application Priority Data

Sep. 28, 1995 [JP] Japan .................................. 7-250009

[51] Int. Cl.$^6$ .............................. H04N 7/00; H04L 9/00
[52] U.S. Cl. ................................. 348/5.5; 380/5
[58] Field of Search ................. 348/5.5; 380/5, 380/7, 10

[56] References Cited

U.S. PATENT DOCUMENTS

| | | | |
|---|---|---|---|
| 4,348,696 | 9/1982 | Beier | 358/188 |
| 5,168,372 | 12/1992 | Sweetser | 358/349 |
| 5,465,113 | 11/1995 | Gilboy | 348/5.5 |
| 5,701,131 | 12/1997 | Kuga | 345/8 |
| 5,701,202 | 12/1997 | Takahashi | 359/631 |

Primary Examiner—Thomas H. Tarcza
Assistant Examiner—Carmen D. White
Attorney, Agent, or Firm—Ronald P. Kananen

[57] ABSTRACT

In order to give restriction to use of apparatus by children or minor persons or the like, a password is previously registered and when the power switch is turned on, a user inputs the password from the second remote controller. The controller controls the apparatus to turn on the image input switch SW only when the inputted password is matched with the registered password. Moreover, the controller displays, when the predetermined period has passed from initiation of image display, a warning for health of eyes on the liquid crystal display means and continues image display only when the will for continuous display such as repeated input of the password is indicated.

26 Claims, 6 Drawing Sheets

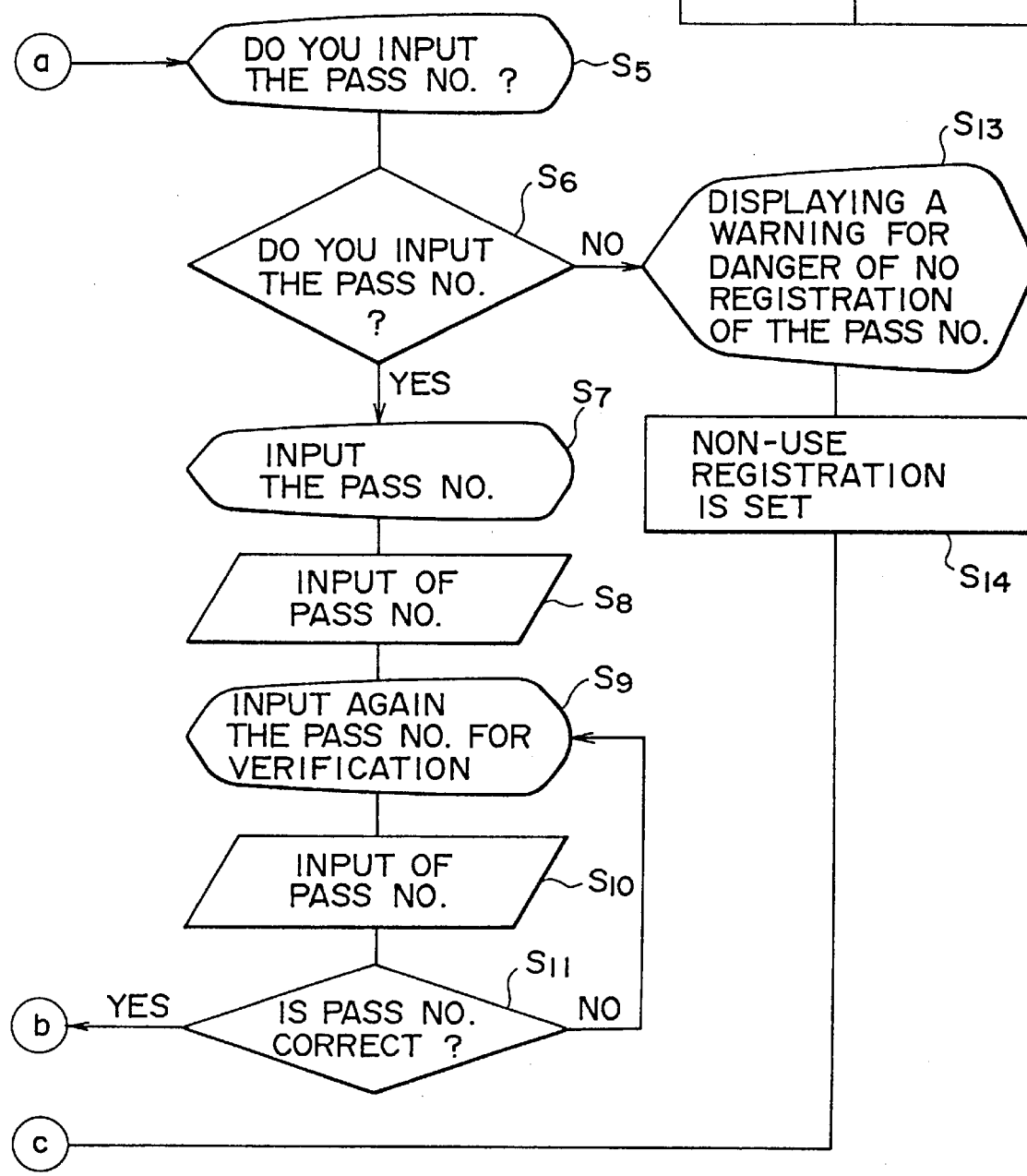

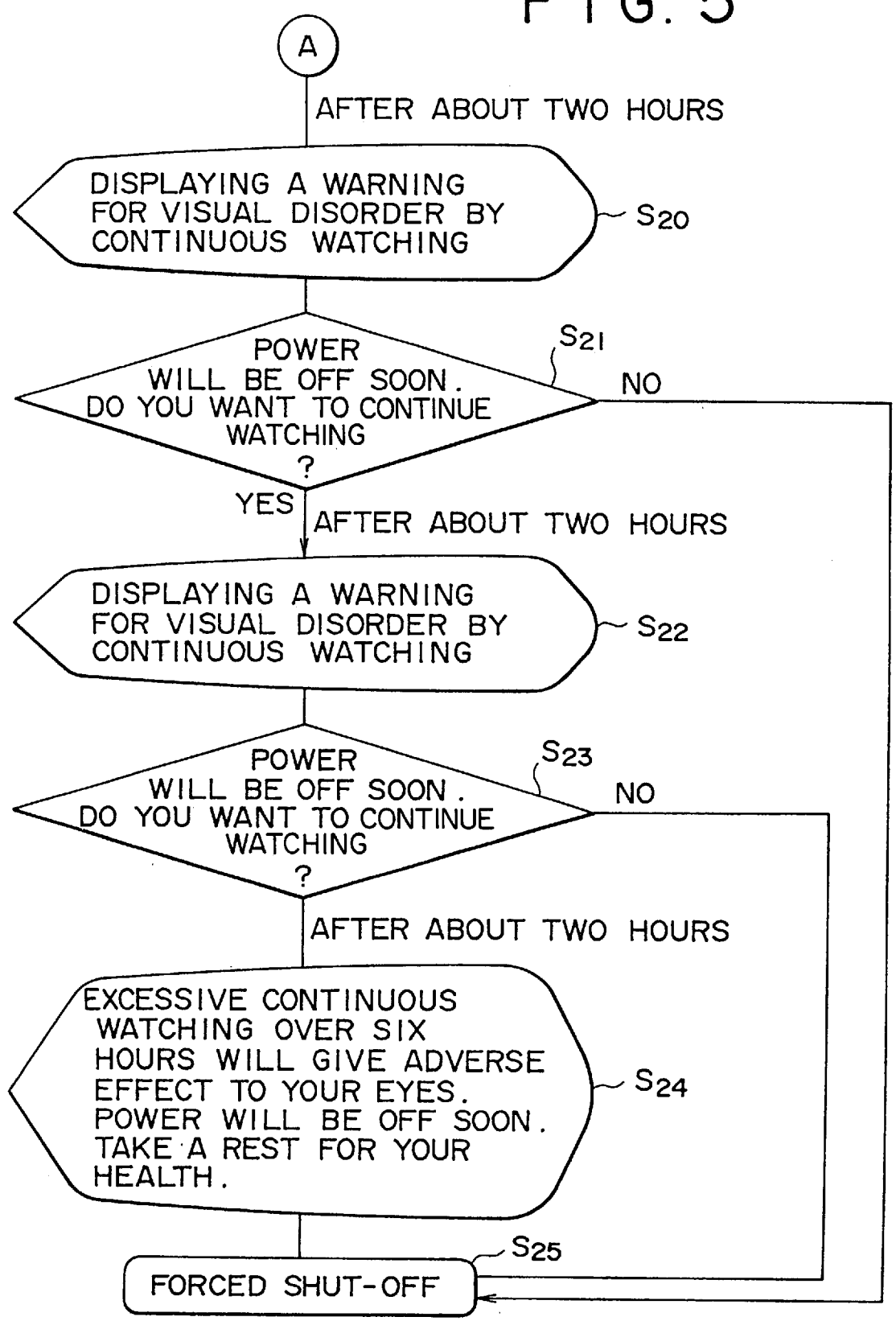

OPTICAL VISUALIZING APPARATUS AND METHOD OF CONTROLLING THE SAME

BACKGROUND OF THE INVENTION

1. Field of the Invention

The present invention relates to an optical visualizing apparatus that may be assumed to contribute to eye troubles for health of eyes and a method of controlling the same apparatus.

2. Description of Related Art

An optical visualizing apparatus, for example, has been proposed. A user who wants to enjoy such apparatus like glasses around his head or his eyes to display images in near front of his face.

Such head-mount type or glasses-type optical visualizing apparatus displays images just in front of eyes. Therefore, the apparatus is now under research including medical investigations as to what adverse effects would occur a minor person (from age 0 to 18) wears it or if a user, whether a minor person or an adult, wears it for a long time period.

However, any restriction has not been given for use by children and minor persons or the like even when there has been such health concerns, as explained above.

SUMMARY OF THE INVENTION

It is therefore an object of the present invention to provide an optical visualizing apparatus that may be used with restricted access for children and minor persons or the like and a method of controlling the same.

In view of the problems explained above, an optical visualizing apparatus of the present invention comprises an image display means for displaying images based on the video signal, a password inputting means for inputting a password, a memory means for storing a password inputted by the password inputting means and a control means for comparing the password inputted from the password inputting means and the password stored in the memory means to allow display of an image on the image display means only when both passwords are matched.

Moreover, the method of controlling the optical visualizing apparatus allows, upon input of a password, display of images on the image display means occurs only when the input password matches the registered password.

Namely, no image is displayed, unless a password matching the registered password is inputted.

BRIEF DESCRIPTION OF THE DRAWINGS

The preferred embodiment of the present invention will be described in detail with reference to the following figures wherein:

FIG. 5 is a flowchart of operations to be executed after initiation of display of images.

DETAILED DESCRIPTION OF THE PREFERRED EMBODIMENTS

Figure 1A:
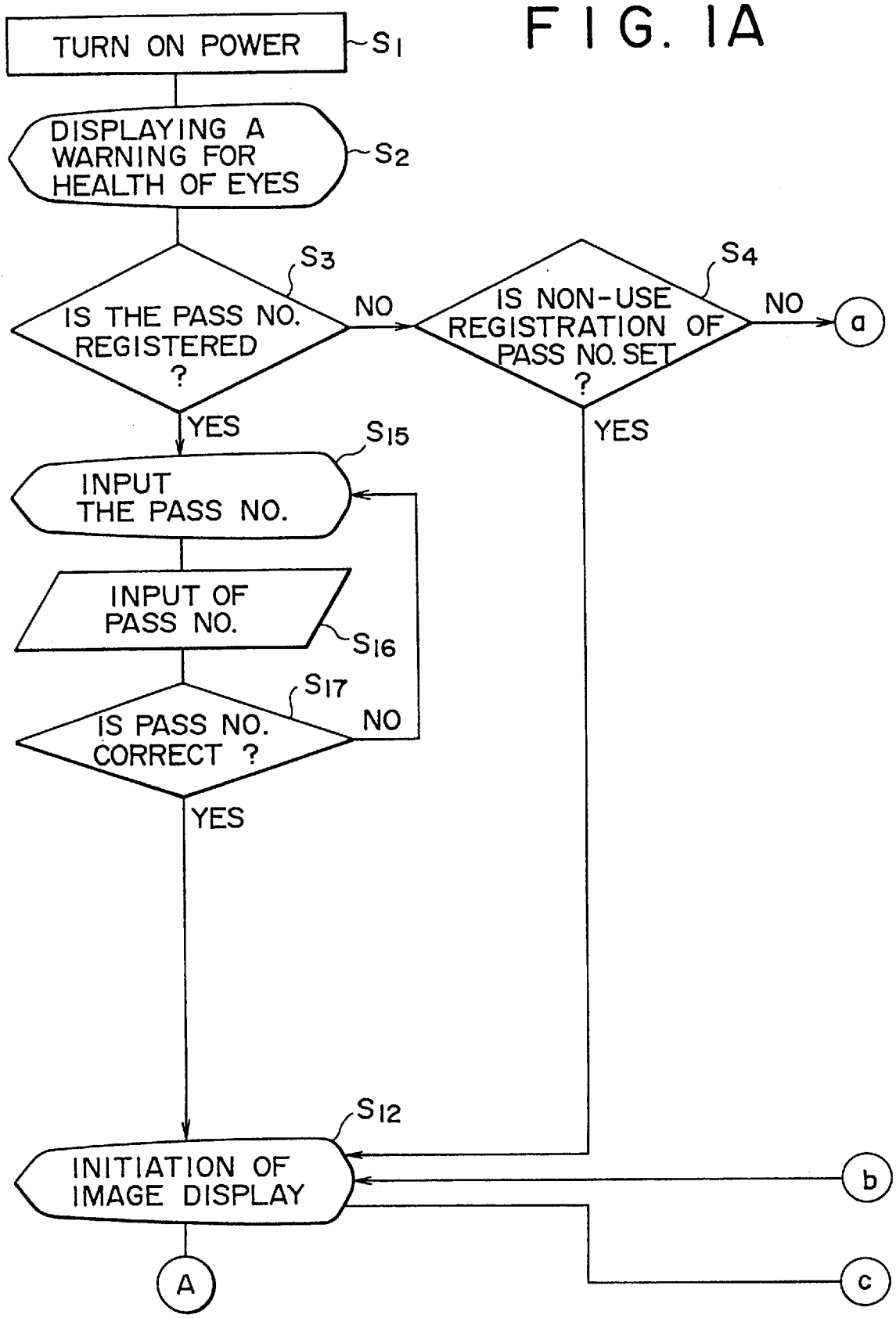
FIG. 1 is a flowchart of operations to be executed until display of image is initiated.
Figure 2:
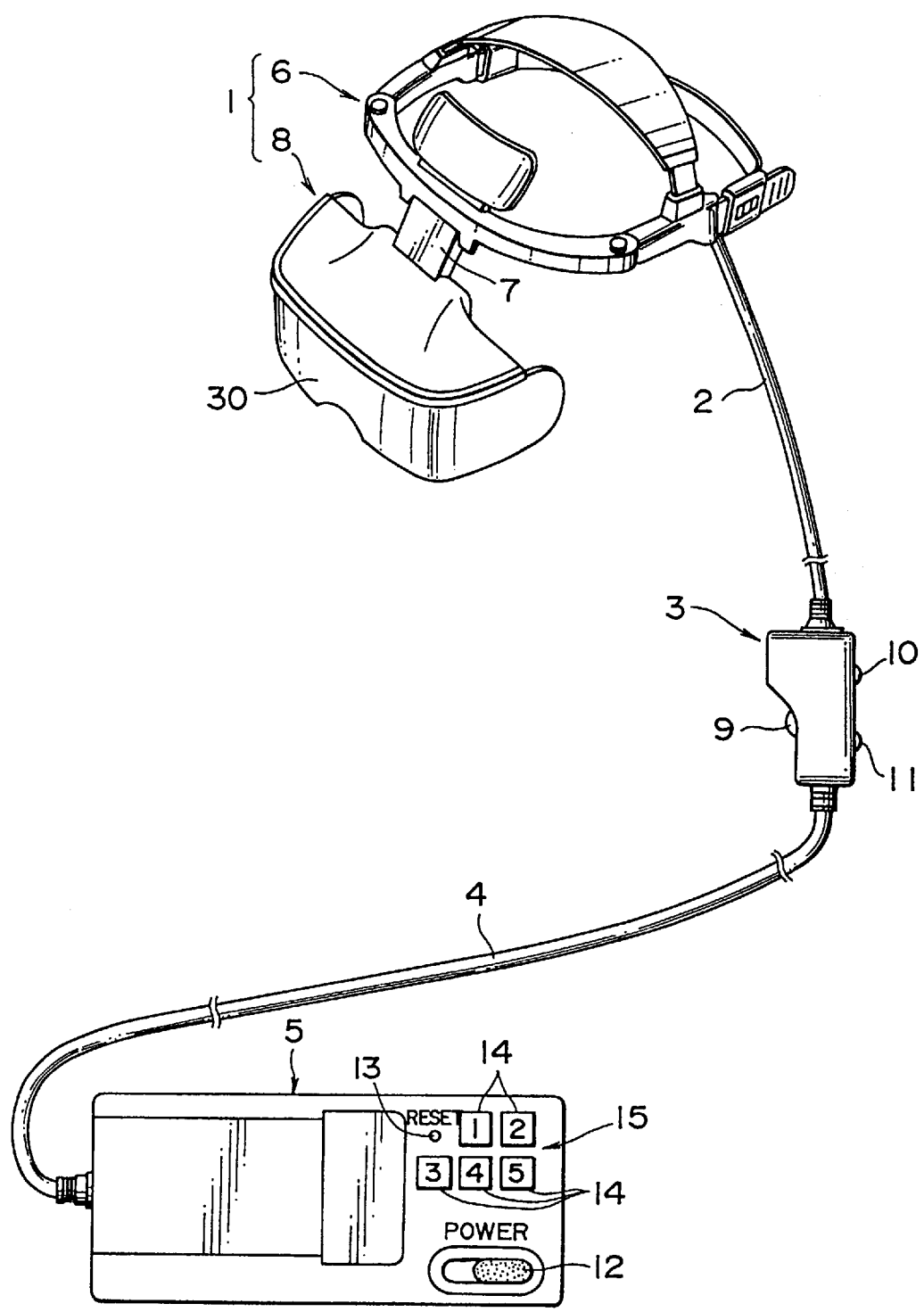
FIG. 2 is a perspective view of the entire part of an optical visualizing apparatus.

A preferred embodiment of the present invention will be explained below with reference to the accompanying drawings. FIG. 1 to FIG. 5 illustrate an example where the present invention is applied to a head mount type optical visualizing apparatus. FIG. 2 illustrates a perspective view of the head mount type optical visualizing apparatus. In FIG. 2, an optical visualizing apparatus comprises an optical visualizing apparatus body 1, a first remote controller 3 connected to the optical visualizing apparatus body 1 via a cord 2 and a second remote controller 5 connected to the first remote controller 3 via a cord 4.

The optical visualizing apparatus body 1 is composed of a head mounting means 6 and an optical visualizing means 8 connected to this head mounting means 6 via a coupling means 7. The head mounting means 6 is designed to be freely mounted to the head of a user and the optical visualizing means 8 is located in front of the face with the head mounting means 6 loaded around the head. The structure of the optical visualizing means 8 will be explained below.

The first remote controller 3 is provided with a brightness control knob 9 of a liquid display means 22 (shown in FIG. 3), a gray level control knob 10 of a liquid shutter 28 (shown in FIG. 3) and a sound volume control knob 11. The sound level of the loud speaker (not illustrated) can be controlled with the sound volume control knob 11.

The second remote controller 5 is provided with a power switch 12, a reset button 13 and numerical buttons 14 from 1 to 5. These numerical buttons 14 are used to input the password by forming a password input means 15.

Figure 3:
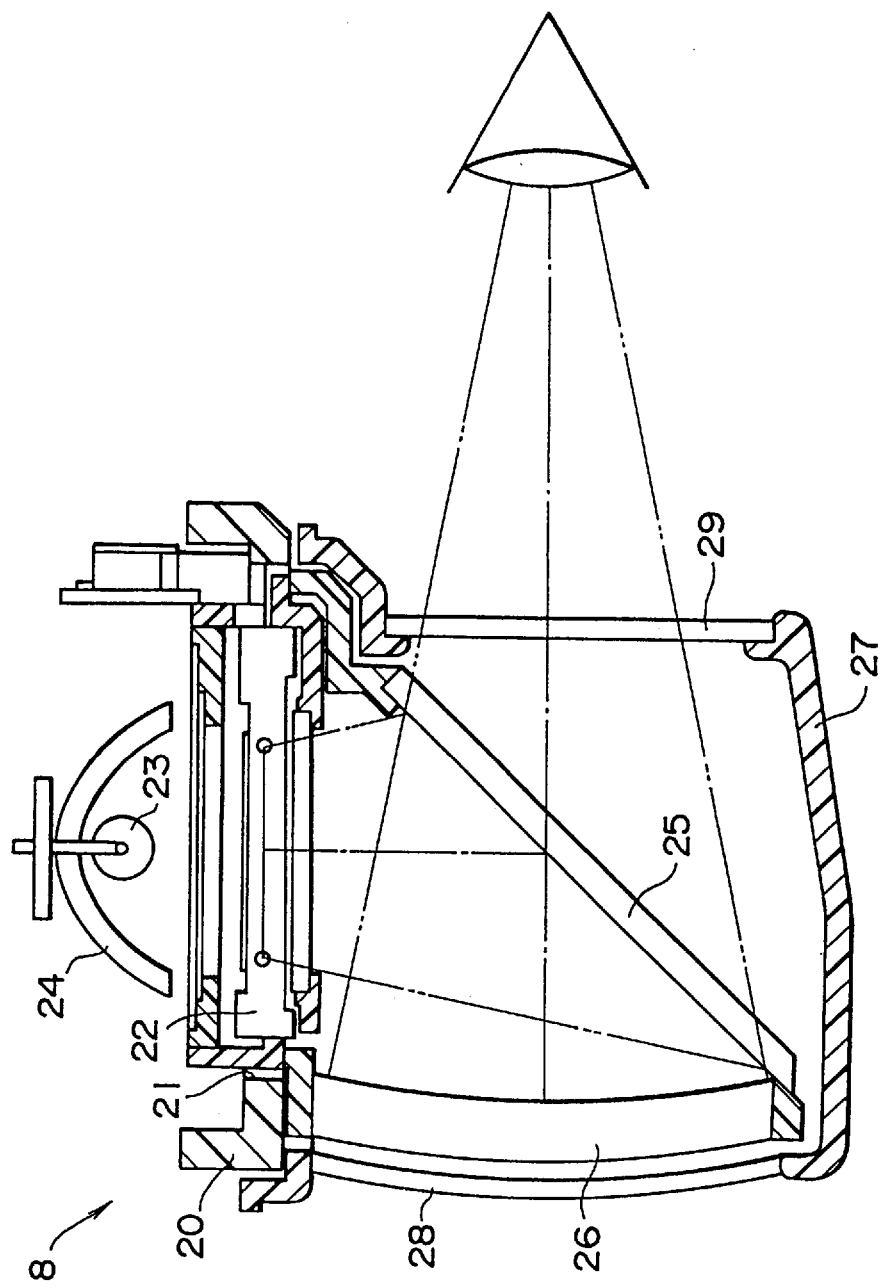
FIG. 3 is a cross-sectional view of an optical visualizing apparatus.

FIG. 3 shows a vertical cross-sectional view of the optical visualizing means 8. In FIG. 3, the liquid crystal arranging holes 21 are formed symmetrically at the right and left positions of the main frame 20 and liquid crystal display means 22 are respectively arranged as the image display means to these liquid crystal arranging holes 21. At the upper part of each liquid crystal display means 22, a fluorescent lamp 23 which is used as the back light and a reflector 24 for reflecting the light of this fluorescent lamp 23 are respectively provided. Moreover, at the lower part of each liquid crystal display means 22, a half-mirror 25 and a concave half-mirror 26 irradiated with the light reflected by this half-mirror 25. This half-mirror 25 and the concave half-mirror 26 are fixed within each barrel cover 27, a liquid crystal shutter 28 is provided in front of this barrel cover 27, while a watching window 29 is provided at the rear surface of the barrel cover 27. The upper surface side of the main frame 20 and front surface side of both barrel covers 27 are covered with a protection cover 30 (shown in FIG. 2) and the front surface side of this protection cover 30 is formed of a light transmitting member.

Namely, an image of the liquid crystal display means 22 is reflected by the half-mirror 25 toward the front side and this reflected light is enlarged by the concave half-mirror 26. Thereby, a user is capable of watching this enlarged image through the watching window 29. When brightness of the liquid crystal shutter 28 is raised with the gray level control knob 10 provided on the liquid crystal shutter 28, a user is also capable of watching the external background in addition to the image of the liquid crystal display means 22 and when the brightness of the liquid crystal shutter 28 is lowered, a user is capable of watching only the image of the liquid crystal display means 22.

Figure 4:
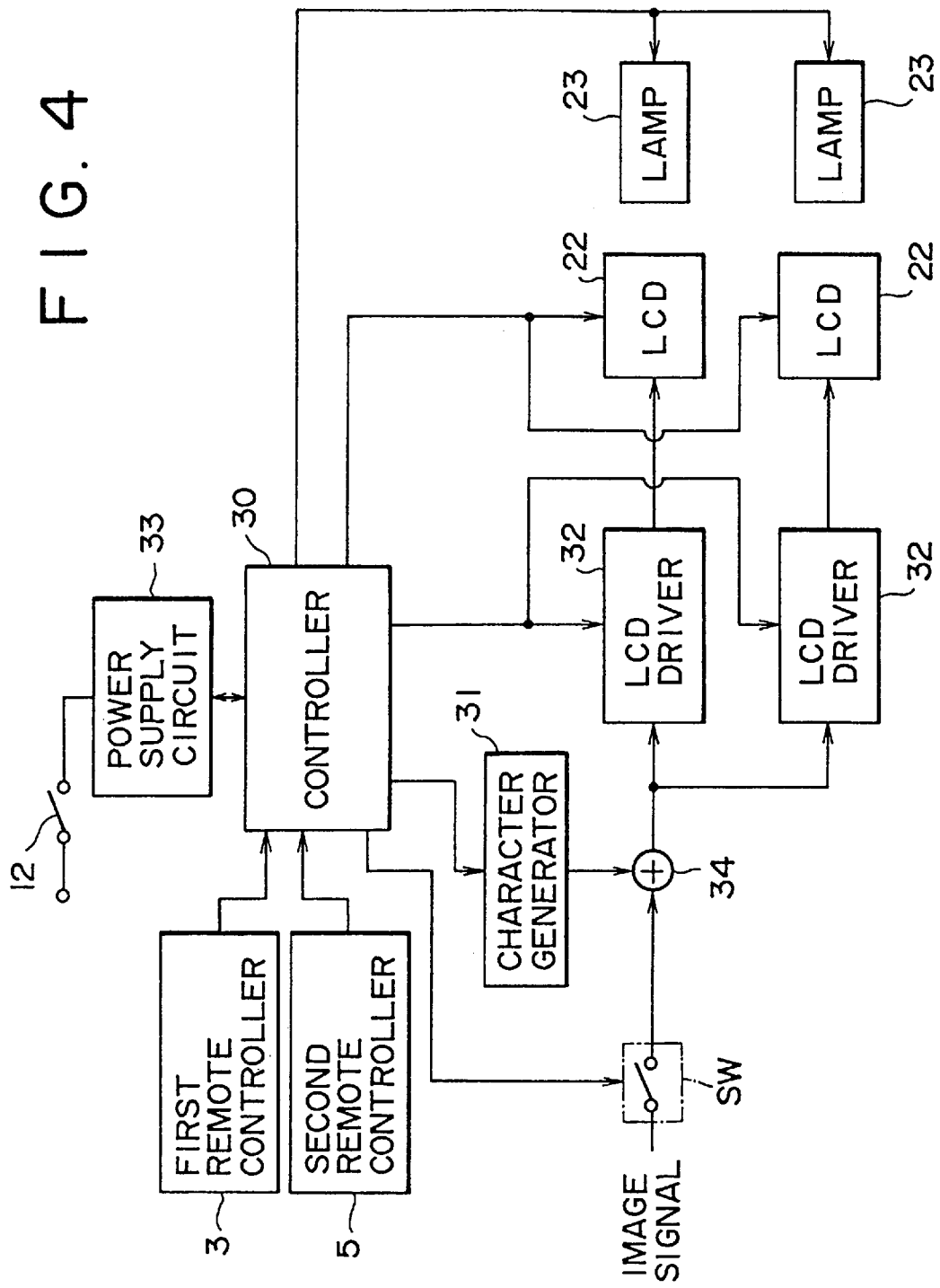
FIG. 4 is a block diagram of the essential circuits of an optical visualizing apparatus.

FIG. 4 illustrates a block diagram of the essential circuit of the optical visualizing apparatus. In FIG. 4, each input command of the first remote controller 3 and second remote controller 5 is supplied to a controller 30 to control a character generator 31, liquid crystal display driver 32, liquid crystal display means 22, fluorescent lamp 23 and power supply 33, etc. The controller 30 has a built-in memory as the storing means in which a password or the like is stored. The controller 30 executes programs shown in FIG. 1 and FIG. 5. FIG. 1 and FIG. 5 will be explained in detail in the paragraph describing the operation of the apparatus. The character generator 31 outputs the image signals of characters or the like based on the command of the controller 30 and this image signal is added to the original image signal in the adder 34. The original image signal is supplied through an image input switch SW from an external source (not illustrated) and this image input switch SW is controlled by the controller 30.

Next, operation of this apparatus will be explained. As shown in FIG. 1, when a user turns on (step S1) the power switch 12 as shown in FIG. 1, the power supply circuit 33 supplies the power source voltage to each circuit and the controller 30 controls the character generator 31. Here, a warning regarding eye health is displayed (step S2) on the liquid display means 22 and this display is continued until a user executes the next operation. Then, the controller 30 reads the built-in memory to judge whether a password is registered or not (step S3).

If the password is not registered a message "Do you want to register the password? Depress 1 for YES and 2 for NO", for example, is displayed on the screen (step S5), except for the case where "Non-use" is registered. For registration of the password, it is required to depress the button "1" of numerical button 14 on the second controller 5. Thereby, the controller 30 controls the character generator 31 and a message "Input the password" is displayed on the liquid crystal display means 22 (step S7). Here, a user inputs the password by operating the numerical button 14 of the second controller 5 (S8). A numeral of the password inputted is sequentially displayed on the display screen. When the password is inputted, a message "Input again the password for verification" is displayed on the screen (S9). When a user inputs again the password (step S10) and it is verified as correct, he turns on the image input switch SW to start the display of image (step S12). The password can be changed by depressing a reset button 13. Moreover, if a user does not want to register the password, he depresses the button "2" of the numerical button 14 of the controller 5. Thereby, the controller 30 controls the character generator 31, causing the liquid crystal display means 22 to display a warning for danger of no registration of the password (step S13). Here, the controller 30 sets the "No-use registration" mode (step S14). Next, a user turns on the image input switch SW to start the display of image (step S12).

That is, when the password is registered, the controller 30 controls the character generator 31, causing the liquid crystal display means 22 to display a message "Input the password" (step S15). When a user inputs the password by operating the numerical button 14 of the second remote controller 5 (step S16), this input password is judged whether it matches with the registered password or not (step S17). When the passwords are matched, a user turns on the image input switch SW to start the display of image.

When "the password is not yet registered" and "No-use registration" mode is set, display of image is started without the input operation of the password.

Namely, if a guardian of minors or the like sets and registers the password to prevent the use of the apparatus without input of such password, the possibility of use by children or minor persons may be lowered.

As shown in FIG. 5, when two hours have passed after initiation of the image display, the controller 30 controls the character generator 31 to display a warning regarding visual disorder by continuous watching on the liquid crystal display means 22 (step S20). Next, a message "Power supply will be off soon. Do you want to watch continuously?" (step S21) is displayed and when "Input of password" or "Operation of key for continuation" is carried out indicating that the user wishes to continue watching the image for continuous watching, display of the image is continued. If the desire for continuous watching is not indicated by the user, the power supply circuit 33 is forcibly turned off. When image display is continued for about two hours, the warning as explained above is displayed again (steps S22, S23). When the user indicates that watching should continue, the image display is continued again. When another two hours have passed, a message "Continuous watching over six hours will give adverse effect on your eyes. Power supply will be off soon. Take a rest for your health." is displayed (Step S24). Thereafter, the power supply circuit 33 is forcibly turned off (step S25).

That is, a warning for watching is displayed every two hours to urge a user to decide consciously whether to continue watching or not. Thereby, a user can prevent by himself excessive watching for a long period.

In the above embodiment, if a plurality of passwords can be inputted, many users can use the same apparatus. Moreover, when the password registered may be changed freely as required, if a child knows the password registered now, use of the apparatus can still be restricted by changing the current password. Moreover, long term excessive watching may be effectively prevented by designing the apparatus in such a manner that the same password cannot be used for the continuous watching when the power supply is forcibly turned off and then turned on again. Furthermore, the optimum image can be displayed for each user by storing various settings (quality of image and brightness, etc.) of each user for every password when a plurality of passwords are registered.

In above embodiment, a password is designated by a string of numerals and may also be designated by a string of codes or characters or a string of codes, characters and numerals.

As described above, according to the present invention, since the apparatus is designed so that it does not start display of image until the password matching the registered password is inputted, restriction may effectively be given to use by children or minor persons or the like.

Moreover, the present invention provides the effect that long term excessive watching can be prevented because a warning for health of eyes is displayed when a predetermined time has passed after start of the image display and image display can be continued only when the desire for continuous watching is indicated explicitly by the user.

What is claimed is:

1. An optical visualizing apparatus, comprising:
   image display means for displaying images based on an image signal;
   password input means for receiving an input password;
   memory means for storing the input password inputted into said password input means and for storing at least one correct password; and
   a controller for comparing the input password inputted into said password input means with at least one correct password stored in said memory means to cause said image display means to display an image only when both the input and the correct passwords match, wherein said controller requests input of the input password at a predetermined time period after a start time of the image display on said image display means before continuing said image display after the predetermined time period.

2. An optical visualizing apparatus as recited in claim 1, wherein said controller displays a warning regarding possible harm to eye health when requesting input of the input password.

3. An optical visualizing apparatus recited in claim 1, wherein said controller stops power from reaching said image display means when said input password is not inputted or when said input password does not match the correct password stored in said memory means.

4. An optical visualizing apparatus recited in claim 1, wherein said controller requests input of said input password at a first predetermined time period after a start time of the image display on said image display means and at a second predetermined time period after the controller requests input of said input password before continuing said image display after each predetermined time period.

5. An optical visualizing apparatus recited in claim 4, wherein said predetermined time period is two hours.

6. An optical visualizing apparatus recited in claim 4, wherein said controller stops power from reaching said image display means when said input password has been requested a predetermined number of times.

7. An optical visualizing apparatus recited in claim 6, wherein said predetermined number of times is three times.

8. An optical visualizing apparatus recited in claim 1, wherein said memory means stores a plurality of correct passwords.

9. An optical visualizing apparatus recited in claim 6, wherein said memory means stores a plurality of correct passwords and said controller inhibits use of one of said plurality of correct passwords that is the same as another of said plurality of correct passwords used previously if a user restarts supply of power to the image display means after the controller stops power from reaching the image display means.

10. An optical visualizing apparatus recited in claim 8, wherein said memory means stores a plurality of control settings of said image display means, wherein each control setting corresponds to at least one of said plurality of correct passwords.

11. A head-mount type display, comprising:
    image display means for displaying images based on an image signal;
    password input means for receiving an input password;
    memory means for storing the input password inputted into said password input means and for storing at least one correct password; and
    a controller for comparing the password inputted into said password input means with at least one correct password stored in said memory means to cause said image display means to display an image only when both the input and the correct passwords match, wherein said controller requests input of the input password at a predetermined time period after a start time of the image display on said image display means before continuing said image display after the predetermined time period.

12. A head-mount type display recited in claim 11, wherein said controller displays a warning regarding possible harm to eye health when requesting input of the input password.

13. A head-mount type display recited in claim 11, wherein said controller stops power from reaching said image display means when said input password is not inputted or when said input password does not match the correct password stored in said memory.

14. A head-mount type display recited in claim 11, wherein said controller requests input of said input password at a first predetermined time period after a start time of the image display on said image display means and at a second predetermined time period after the controller requests input of said input password before continuing said image display after each predetermined time period.

15. A head-mount type display recited in claim 14, wherein said predetermined time period is two hours.

16. A head-mount type display recited in claim 14, wherein said controller stops power from reaching said image display means when said input password has been requested a predetermined number of times.

17. A head-mount type display recited in claim 16, wherein said predetermined number of times is three times.

18. A head-mount type display recited in claim 11, wherein said memory means stores a plurality of correct passwords.

19. A head-mount type display recited in claim 16, wherein said memory means stores a plurality of correct passwords and said controller inhibits use of one of said plurality of correct passwords that is the same as another of said plurality of correct passwords used previously if a user restarts supply of power to the image display means after the controller stops power from reaching the image display means.

20. A head-mount type display recited in claim 18, wherein said memory means stores a plurality of control settings of said image display means, wherein each control setting corresponds to at least one of said plurality of correct passwords.

21. A method of controlling an optical visualization apparatus, comprising:
    requesting input of an input password for continuation of said image display when a predetermined time period has passed from the start of the image display to said image display means;
    comparing an input password with a correct password in a memory means when the input password is inputted into the apparatus; and
    displaying an image on an image display means only when the input password and the correct password match.

22. A method of controlling the optical visualizing apparatus recited in claim 21, further comprising:
    requesting input of the input password at a first predetermined time period after a start time of the image display on said image display means and at a second predetermined time period after the controller requests input of said input password before continuing said image display after each predetermined time period; and
    stopping power from reaching the image display means after the input password has been requested a predetermined number of times.

23. A method of controlling the optical visualizing apparatus recited in claim 21, wherein said requesting step is conducted two hours after the start of the image display on said image display means, wherein said requesting step is repeated after another two hours and wherein said stooping step is conducted after another two hours.

24. The apparatus of claim 1, wherein said memory means contains a first correct password and a second correct password that is different from the first correct password, and wherein the first password is used at the first predetermined time period and the second password is used at the second predetermined time period such that a different input password must be entered into said input means and matched with a different correct password to continue image display at each predetermined time period.

25. The head-mount type display of claim 11, wherein said memory means contains a first correct password and a second correct password that is different from the first correct password, and wherein the first password is used at the first predetermined time period and the second password is used when the second predetermined time period has passed such that a different input password must be entered into said input means and matched with a different correct password to continue image display at each predetermined time period.

26. The method of claim 21, wherein the memory means contains a first correct password and a second correct password that is different from the first correct password such that a first input password is requested at the first predetermined time period and a second input password is requested at the second predetermined time period such that a different input password must be entered into said input means and matched with a different correct password to continue display of the image at each predetermined time period.

\* \* \* \* \*

UNITED STATES PATENT AND TRADEMARK OFFICE
CERTIFICATE OF CORRECTION

PATENT NO. : 5,841,466
DATED : November 24, 1998
INVENTOR(S) : Motoshi MIZOGUCHI, Daiji TAKAHASHI and Yoshio OKOSHI It is certified that error appears in the above-identified patent and that said Letters Patent is hereby corrected as shown below:

Column 6, claim 23 should read as follows:

23. A method of controlling the optical visualizing apparatus recited in claim 21, wherein said requesting step is conducted two hours after the start of the image display on said image display means, wherein said requesting step is repeated after another two hours and wherein said stopping step is conducted after another two hours.

Signed and Sealed this

Thirtieth Day of March, 1999

*Attest:*

Q. TODD DICKINSON

*Attesting Officer*     *Acting Commissioner of Patents and Trademarks*